United States Patent [19]

Babsch et al.

[11] Patent Number: 4,818,127

[45] Date of Patent: Apr. 4, 1989

[54] INCLINED WRITING BY MEANS OF MATRIX PRINTER

[75] Inventors: Alfred Babsch, Ulm-Soerflingen; Manfred Gruener, Ulm; Jutta Stein, Illertissen, all of Fed. Rep. of Germany

[73] Assignee: Mannesmann AG, Duesseldorf, Fed. Rep. of Germany

[21] Appl. No.: 889,415

[22] Filed: Jul. 24, 1986

[30] Foreign Application Priority Data

Jul. 24, 1985 [DE] Fed. Rep. of Germany ....... 3526369

[51] Int. Cl.$^4$ ................................................ B41J 3/12
[52] U.S. Cl. .................................. 400/121; 101/93.04; 400/124
[58] Field of Search ............................. 400/121, 124; 101/93.04, 93.05; 340/723, 727, 735

[56] References Cited

U.S. PATENT DOCUMENTS 3,708,050  1/1973  McCarthy ............................. 400/124
4,031,992  6/1977  Murat .............................. 101/93.05 X
4,071,130  1/1978  Lichti ................................ 400/124

Primary Examiner—Paul T. Sewell

Attorney, Agent, or Firm—Ralf H. Siegemund

[57] ABSTRACT

Digital micro-processor accessory for generating obliquely oriented character printing (cursive writing) under utilization of matrix print principles using a plurality of print elements (e.g. styli) arranged in one or more columns, as well as a character generator and a circuit for controlling the print elements, further including the following combination of elements; a plurality of differently long shift registers for operating in parallel; a data register receiving print character bits; a circuit for selecting column organized print information from the data register to be shifted through the shift registers in a first orientation such that a high point in a column receives the longest, and a low point, the shortest delay, and for inverting that order in response to a reversal in direction of printing; the shift rate determines the obliqueness; a data bit distributing circuit for selectively feeding the data bits having been shifted through the shift registers in the initial or the inverted order to the control circuits; and a circuit bypassing the shift registers for directly feeding the data from the data register to the print element control circuits for obtaining regular vertical line printing.

2 Claims, 3 Drawing Sheets

INCLINED WRITING BY MEANS OF MATRIX PRINTER

BACKGROUND OF THE INVENTION

The present invention relates to digital microprocessing facilities for use in printers, enabling the printer to generate cursive writing, with particular emphasis on output devices for data processing facilities, and with further emphasis on utilization of the facility in conjunction with matrix printers, having print elements such as needles, styli, hammers or the like, arranged in one or several columns.

Printing facilities of the type to which the invention pertains generally include a symbol or character generator, a processing facility that calls on the symbol generator in a sequence for purposes of readout of digital representation of particular characters and symbols, and a driver circuit for driving the various print elements in accordance with a program that uses the character representing bits to generate the respective character or symbol. Each of the character is composed on a dot column by dot column basis under utilization of one or a plurality of the individual print elements as they are arranged in a column. They are actuated sequentially as the print process moves from column to column.

The columnar arrangement of the print elements on one hand, and the concurrency of print elements actuation entail a generally vertical oriented appearance of each character. However, if one interposes (e.g. by means of variable length shift registers) delays for triggering of the several print elements, one can generate an oblique character appearance—a cursive writing style.

Data output devices generally and matrix printers in particular are usually required to process a large amount of data furnished to them by a computer. This processing must occur in a relative short period of time whereby it has to be borne in mind that from the point of view of computer operation the physical print process, no matter how fast it appears to be, is a relatively slow process, and a high speed operation is desired in order to avoid unnecessary pauses in computer operation.

Generally speaking, the processing of raw data may involve the processing of information which permits display, for example, on a monitor screen in a terminal or printout of such data in order to obtain a permanent record, whereby the latter is, of course, a relatively slow process. The matrix printers that are used in many instances pose in addition certain problems of slowness, simply on account of composing characters individually out of a multiple of dots. On the other hand, economic considerations have led to a widespread adoption of matrix print technology.

A computer generally, will transmit binary signals from its working memory or a memory extension, including relatively slow external data storage facilities, to an output device generally and in particular to a matrix printer. Herein then lines and columns of a character matrix to be printed are determined as stated by the function, operation, and design of the symbol or character generator. The binary signals, moreover, will also control a certain enhancement of printing, for example, in case of high quality print operation, and this increase is either produced in the data station or directly on the print medium.

An interpositioning of digital micro-processors between the computer generating the data to be printed out generally and the print process proper is generally known in order to obtain certain autonomy on part of the print facilities, so that the printer does not tie up to the computer operation directly.

After this general background, reference is made to German printed patent application No. 24 57 884, which is a representative example of a buffering type digital microprocessor. The reference particularly refers to the utilization of a micro-processor for purposes of generating cursive writing. As stated, cursive writing basically requires a transposition of the printing process such that originally envisioned (as far as the character generator is concerned) vertical lines are converted into lines of oblique orientation. Generally speaking, this requires a controlled delay in the printing process as carried out by dot printing elements and on an element for element basis as far as the vertical column of print elements is concerned.

Under normal circumstances (vertical line printing), elements participating in the printing of a vertical line are triggered and operated simultaneously. For purposes of cursive writing these elements have to be actuated in sequence with a non-zero time interval being interposed in between the actuation of two vertically juxtaposed print elements. One has to provide, therefore, individual delay devices to be effective between the character generator on one hand and the driver circuit for the electromagnetic operation of the print element on the other hand. These delay devices, shift registers and logic circuitry permit the selective operation of cursive or normal writing.

The known micro-processor, however, does not satisfy requirements for fast control and at speed sufficient to meet speed requirements as they are necessary in some processing stations in matrix printers. The known method of cursive writing does not consider the fact that matrix printers and other printout and readout stations operate bidirectionally for reasons of avoiding seemingly unnecessary return trips of equipment, towards a given starting position. In other words, the known solution of obtaining cursive writing will be able to work only for printing oblique symbols, when the print process runs, for example, from left to right. In the case of any subsequent printing from right to left these known devices simply are not capable of consistently presenting a cursive letter image. Consequently, the known cursive writers are tied to a significant speed cut. Another disadvantage of the known method is a fixed angle of obliqueness.

DESCRIPTION OF THE INVENTION

It is an object of the present invention to provide a new and improved method and equipment for cursive writing in printers such as matrix printers under utilization of bi-directional print capabilities.

It is another object of the present invention to provide new method and equipment for generating different, stiles in cursive writing, differing, for example, as to the degree of obliqueness.

In accordance with the preferred embodiment of the present invention, it is suggested to provide a new microprocessor expansion which includes a data bus and a mode register connected to it which deactivates shift registers provided for cursive writing for purposes of obtaining vertical lines while activating these registers for oblique or cursive writing whereby the active state permits variable association of the shift registers and print element connections to obtain delays in a particular or the inverted order. This then establishes selectively distributed sequences of print element connections to the data source and to the print elements, which, in turn, permits printing from left to right and from right to left at the same oblique angle of cursive writing style. If the print elements are arranged in a vertical column, a like number of shift registers is provided. For left to right writing, the uppermost (lowermost) print element receives its print bit from the register providing the longest (shortest) delay, for right to left writing it receives its print bit from the register with the shortest (longest) delay. Moreover, high speed writing is no longer limited to vertical writing but may also be carried out in the cursive mode.

In furtherance of the invention it is suggested to provide for a variable shift rate of the shift registers to thereby change the angle of obliqueness. Shifting rates should be generated through a clock generator with a shift time register to facilitate overall organization and permitting integration in IC circuits. In case a column of print elements has an N such elements, the shortest shift registers should have a capacity of two bits the longest will be 2N bits. This feature permits selection of the repetition rate under consideration from one of the lowest possible delays.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

Proceeding now to the detailed description of the drawings, FIG. 2 illustrates a block diagram of a general layout that includes the invention. A micro-processor CPU 44 generates a plurality of data on lines D1 through D8 as well as a plurality of control signals E, CK, CS, AO, AI and MRES, to be explained below. These signals serve as input signals for the inventive processing facility and unit NCU 45. This unit 45 has twelve output lines N1 through N12 for the control of drive stages 46 which, in turn, control print elements PE 1 through 12, presumed to be arranged in a column. Moreover, it is assumed that the print elements are needles or styli.

FIG. 1 illustrates the control unit 45 in detail and as an integrated circuit type micro-processor expansion. The circuit in particular may be situated on one chip. The circuit includes the following sub-components or subsystems arranged in the drawings for ease of reference in columns representing circuit "planes". The left-hand column includes a needle-time register 1, or NTR for short, a clock generator and register access decoder 2, or CGR+d for short, a mode register MR3, a print (or needle) data input register 4, or NDR, a shift time register 5, or STR, and a delay time register 6, or DTR. These components constitute, so to speak, a first circuit plane, and with the exception of 2, they are all tied to a common bus B1. This bus B1 is connected to the plurality of data input lines D1 through D8. The clock generator plus decoder 2 receives the external, high speed clock system CK, a clock and timing signal E, a signal CS for purpose of a chip selection and internal addressing signals A0 and A1 all to be explained more fully below.

Figure 1:
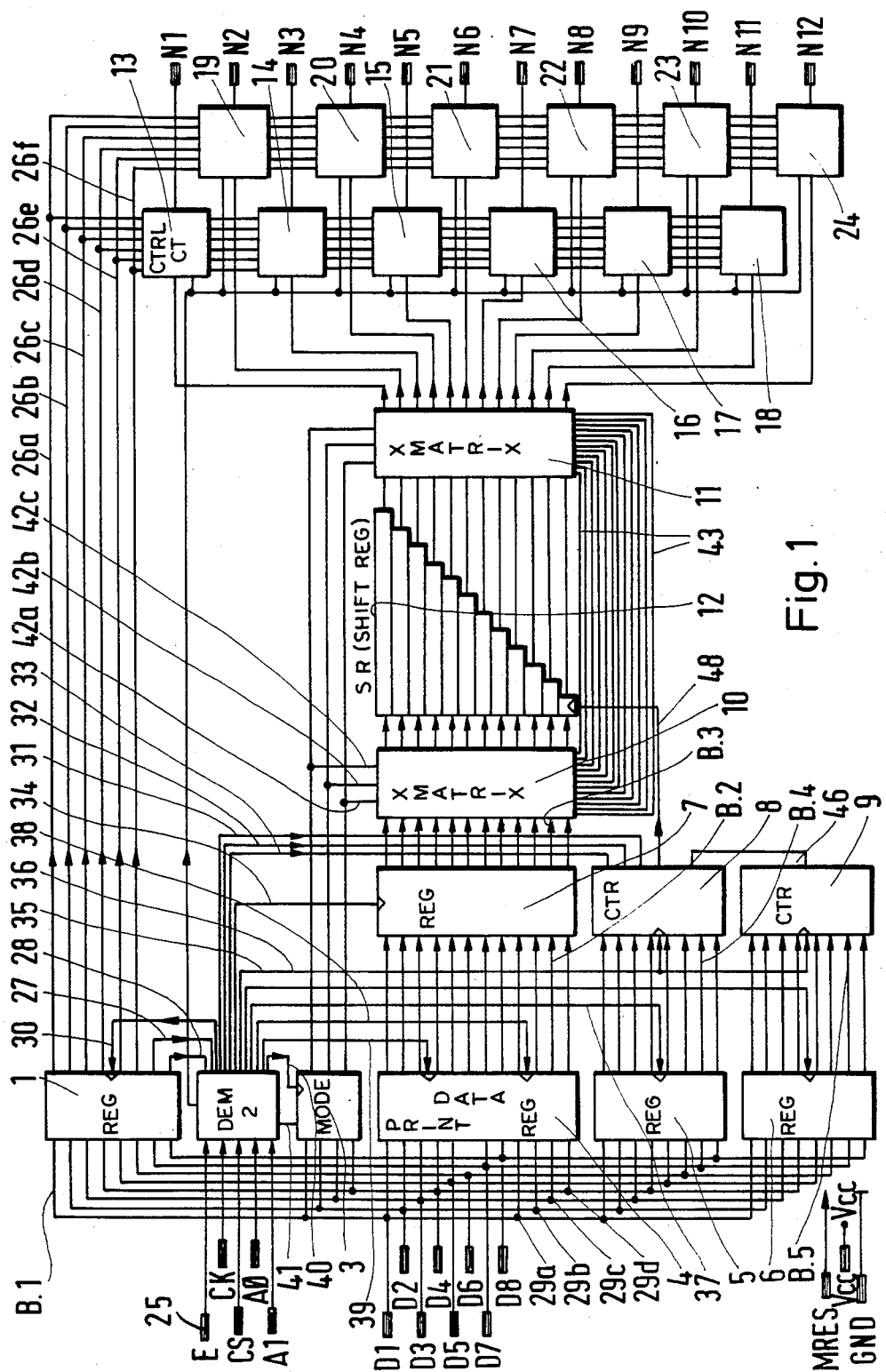
FIG. 1 is a block diagram illustrating the architecture of a micro-processing facility constructed in accordance with the preferred embodiment of the present invention for practicing the best mode thereof.

A second phase of a circuit is arranged in the drawing in a second column and includes a transfer, buffer or data assumption register 7, or AR, a shift clock generator 8 or SCG, and a delay counter 9. Print data are received from micro-processor 44 by input register 4 and set into register 7 via a bus B2 for internal further processing, thus freeing register 4 for asynchronously accepting new data. Analogously, register 5 receives data that will be used to generate the obliqueness of characters. For this operation, a bus B4 connects register 5 to shift clock generator 8. Register 6 is the input buffer for the shift clock counter 9, the connection being by bus B5. This counter ensures vertical character alignment in different print lines.

A third circuit plane includes twelve shift registers 12, a data select logic and switching matrix 10 through which the individual shift registers are connected to the outputs of data register 7 by means of a twelve line bus B3. A second data select logic 11 is connected to the outputs of shift registers 12 and controls the further distribution of the shifted-through data. For ease of reference and to facilitate understanding the length of these individual registers is used as an indicator of the time delay capable of producing. Whether or not this is realized by physical length dimensions is immaterial.

Figure 2:
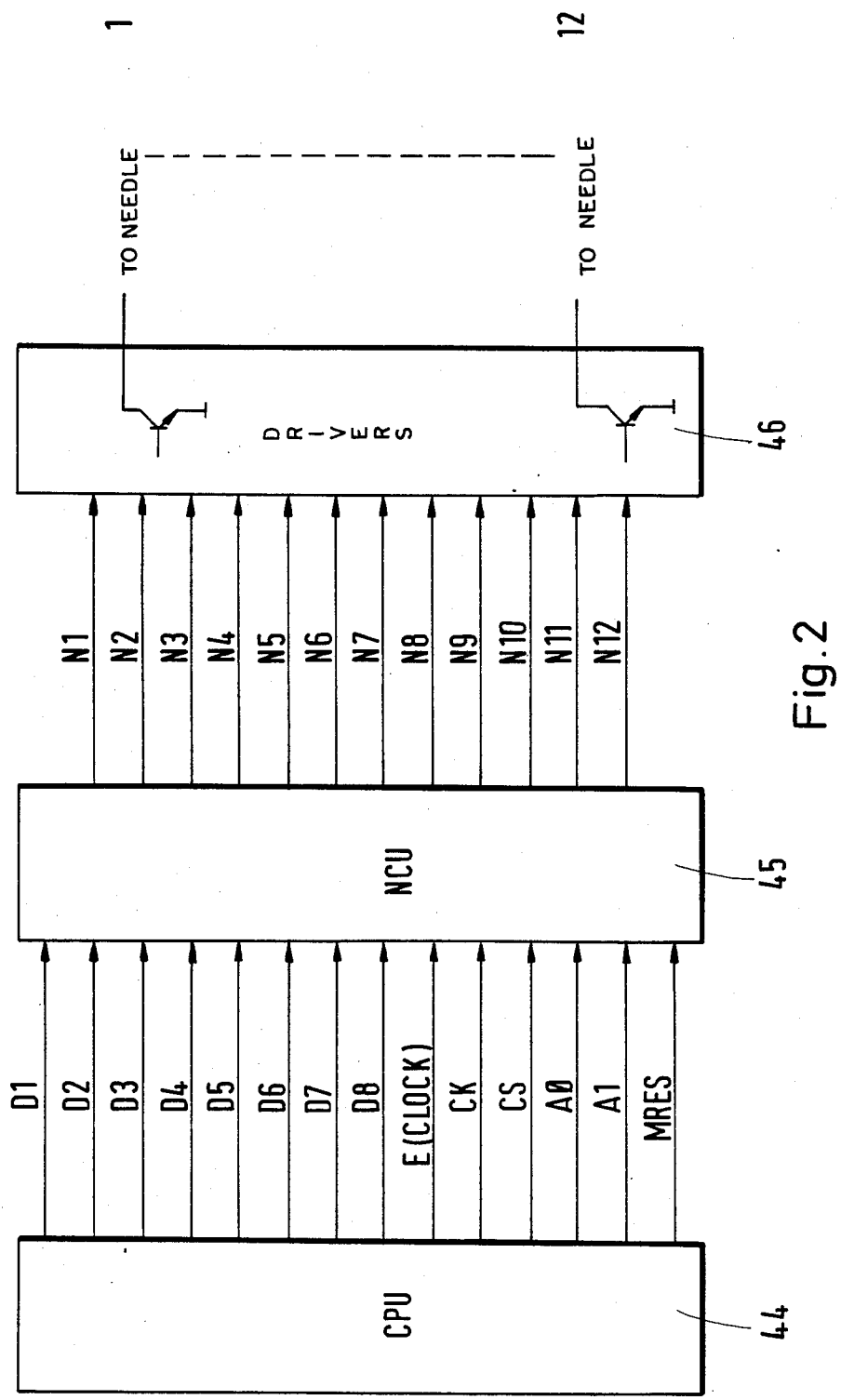
FIG. 2 illustrates the system incorporation of the micro-processing facility shown in FIG. 1 another microprocessor showing also the connections to the print elements of a matrix printer.

In a fourth/fifth plane there are illustrated twelve circuits, 13 through 24, for the control of twelve print needles, arranged in columns for purposes of printing. The control circuit groups are arranged in two planes, including control circuits 13 through 18 for six of the twelve needles in a fourth plane, and a fifth circuit plane includes control circuits 19 through 24 for the other six needles. These circuits 13 through 24 have (or are connected to) the twelve terminals N1 through N12, which lead to the driver stages 46 (FIG. 2).

In the following the components 1 through 24, as listed thus far, are described as subsystems with regard to their interrelationship and functions. The needle time register 1 is connected with all of the needle control circuits 13 through 24, whereby particularly these controls 13 through 24 include counters the time base of which is determined by an external generator (25, not shown) but furnishing the timing signal E. By way of binary timing signals, the six connection lines 26a through 26f provide a predetermined time to the needle controllers 13 through 24, whereby, as can be seen, the controllers 13 through 18, are connected in parallel, and 19 through 24, are also connected in parallel.

Control lines 27 and 28 lead from the needle time register 1 to clock generator-decoder 2, a control line 30 leads from the latter to the clock input of the former. The data bus B1 has eight conductors or lines which, as stated, run in the first circuit plane. Four branches lead from four lines of the data bus B1 to the mode registers 3. All eight conductors of the bus connect to the data output D1 through D8 of processor 44 which includes symbol or character generator. In addition, there are four conductors, 29a through 29d, which are branched off four lines of the data bus B1 for the remaining four print stages in needle data register 4. That register (as well as register 7) has all together twelve stages commensurate with the twelve print elements and needles. One needs two words (or bytes) to transfer the data for one column of print element activation.

The data byte fed from D1 to D8 and bus B1 to the shift time register 5, determines the angle of obliqueness of the individual characters to be printed. An additional connection of bus B1 leads, as stated, to the delay time generator 6.

The clock generator-decoder 2 is connected by means of three lines 31, 32, and 33 to the shift clock generator 8. Another connection 34 leads as clock from decoder 2 to the data transfer, buffer, and assumption register 7 for timing the parallel transfer of data from register 4 into register 7. A clocking connection 35 is provided in parallel to the shift generator 8 as well as to the delay time generator 9 for simultaneous transfer of the content of registers 5 and 6 into registers 8 and 9. Still another clocking connection 36 leads from decoder 2 to the delay time register 6 identifying the data on bus B1 to have register 6 as destination. As further clocking connection 37 leads from decoder 2 to the shift time register 5 identifying a data byte on D1 to D8 and B1 to have register 5 as destination, and two additional connections 38 and 39 run from decoder 2 to the needle data register 4; one of them (39) identifies a data byte on bus B1 as print data for eight of the twelve stages of register 4, and line 38 identifies half a byte on bus B1 (branches 29a–d) to be received by the remaining four stages of register 4. A connection 40 leads from the clock generator-decoder 2 to the mode register 3 and identifies half a byte on B1 as mode input. The connection 41 from the decoder 2 to the mode register 3 signals completion of register loading so that data bit shift operation may now commence.

The mode register 3 basically controls the type or mode of operation of printing, i.e. either whether there is a normal or vertical mode of printing, an oblique printing to the left, or an oblique printing to right, with, of course, identical appearance of the characters, but a mode differentiation is necessary in order to distinquish between printing from the right or printing from the left. The mode register 3 responds to a half byte output of processor 44 and decodes then into the control signal for lines 42a, b, and c.

Thus, the mode register 3 is connected by means of three conductors 42a, b, and c, in parallel to the first data select logic 10, as well as to the second data select logic 11. These connections provide that the shift register 12 are either inactive or are active. In one instance, a mode signal in conductor 42a causes (activates) the twelve conductors 43, for bypassing the registers 12. In this case then, there may be direct and through-connections from the outputs of register 7 (e.g. from top to bottom) to the control circuits 13 through 24, for vertical line printing. In case of an active connection for cursive writing a signal in conductor 42b can select logics 10 and 11 to obtain an oblique position of the characters by interposing the registers 12, for example, in a print pass running from left to right. A signal line 42c, on the other hand, causes reconnection in select logics 10 and 11 to establish an identical oblique position for the characters but for the case the print pass runs from right to left, the interpositioning of register 12 is reversed as to order. Details of these aspects will be described more fully below with reference to FIG. 3.

The clock generator with decoder 2 has, as stated, input connection E for external synchronization. The clock input CK provides, as an input for the timing of the immediate acceptance of data by the transfer register 7. In addition, the chip select signal CS can be used as an address line for registers in this particular microprocessor unit 45. Two additional address or access connections A0 and A1 permit further access selection as far as overall organization of the data flow is concerned, and incorporation of this device in a print data processing facility. Specifically, these three address lines identify the registers as destination for a data byte on lines D1 to D8.

The shift clock generator 8 as well as the delay counter 9 are interconnected by means of a line 47 to synchronize these counters, e.g. by resetting 8 in response to 9. The inventive digital micro-processor 45 is grounded in addition, as well as connected to a suitable supply voltage VCC. The start or initial reset signal MRES was already mentioned.

The needle data register 4 basically receives the needle information (bit pattern) which are received from the symbol or character generator which is external to the system (or output 44). Operation of such symbol and character generator is well known; these bit patterns of characters are transferred to that register 4 for purposes of printing while a direct transfer of these bit patterns from a character generator is possible in principle, the register 4 receives actually information from the CPU 44, as shown in FIG. 2, and the CPU44 extracts these but patterns from the character generator or any other source. This CPU44, as shown schematically in FIG. 2, transfers all of the data D1 through D8, the E clock, the CK clock, the chip selection signals CS and address signals A0 and A1, as well as a master reset signal MRES for obtaining the zero state in the beginning.

In the case of a matrix printer with needles, and also for other type of systems such as ink jet printers or thermo transfer printers, the general layout is as shown in FIG. 2. The accessed oblique writing micro-processor 45 provides needle information in N1 through N12 to external drivers 46 and these, in turn, control the twelve print elements D1 through D12 whatever their construction, as stated.

The oblique angle for printing the individual characters in a slanted (cursive) style is basically selected and controlled by the input received by the shift timing register 5. In particular, the content of this register determines how fast the shift clock generator 8 provides a shift clock sequence to the individual registers in the shift register 12. The shift clock generator 8, moreover, is connected through line 48 to the twelve shift registers 12. Bearing in mind that during printing the print head with the needles moves across the paper at a constant rate, the difference in time with which the data bits emerge from the registers 12 determines their delay in printing which is translated into vertical misalignment, i.e. obliqueness. The timing here determines the individual delays and that, in turn, determines the oblique orientation of the character. The shift rate thus determines that obliqueness. In terms of printing oblique lines, relative timing is involved for sequencing those print operations in a selected manner depending on the byte in 5 and 8 that is counted down for each shift. In case of vertical line printing (bypassing of the registers 12) the transfer out of register 7 will be controlled and trigger and simultaneously.

On the other hand, it must be observed that the obliqueness as such must not be transposed so to speak from print line to print line. Even if the individual characters are to be printed with oblique rather than vertical characters appearance as a whole, they should still be aligned vertically one above the other as far as different character lines are concerned. This is the function of the content of delay time register 6. This register 6 is loaded initially and maintains its content during a normal operation. This register determines the content of counter 9 for countdown. As soon as counter 9 has been counted down to zero, its content is replenished from register 6. This countdown is effective to compensate for the delay differential between SR12 - 1 and SR12 - 12 such that, say, the lowest and left most points of characters in different lines remain aligned regardless of the direction of printing bearing in mind that normally sequential character lines are printed in opposing passes. The oblique position of the characters is determined by the shift time register 5 in conjunction with the shift clock generator 8 and is carried out individually for each individual line, while the register 6 insures a vertical alignment of the print process.

Figure 3:
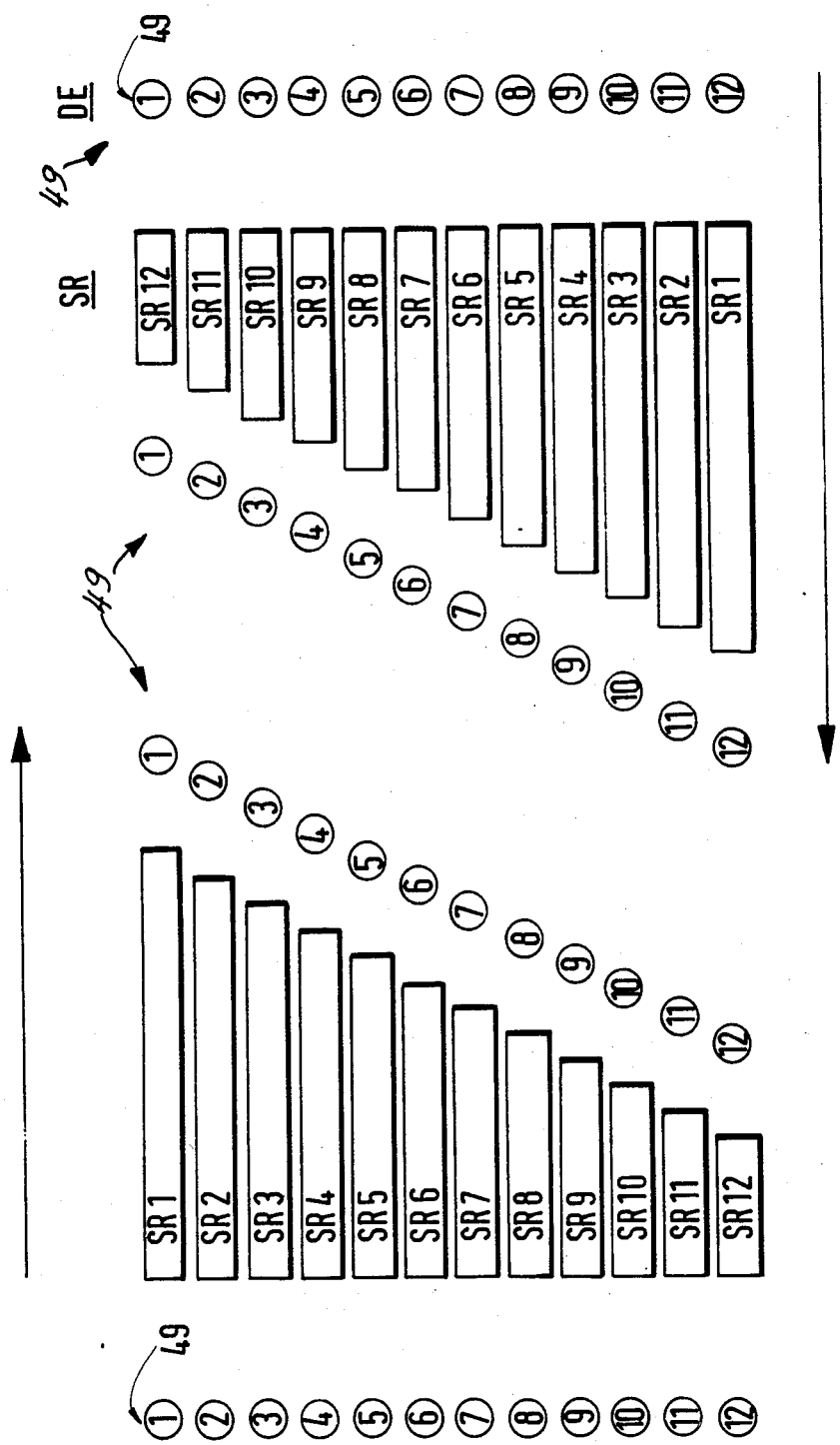
FIG. 3 illustrates schematically the methodology of cursive writing in a for bi-directional operation of printing.

Basically the function of the shift registers 12 can be extracted from FIG. 3. In the case of printing from left to right, as indicated by the upper arrow, the print elements (bits) are represented by the circles 49 with an assumed descending sequence. The bits are shifted into differently long shift registers SR1 through SR12 of the registers 12. The length of these registers again is indicative of the capacity and the delay provided in each instance. Thus, one can see that the print element 49-1 will obtain largest delay, in 49-12 the shortest delay. In case of printing from right to left, e.g. in the next pass, lower arrow, the situation is reversed, and the connections (reconnections as compared with the preceding pass) are made accordingly by operation of switching matrices 10 and 11. The print element 49-1 assumes shortest delay, and 49-12 the longest one. This is necessary because the printing process is simply inverted in this case, and the connections between the shift registers, on one hand, and the print data bits, on the other hand, must be changed in order to reflect this inversion.

In the following an overall description will be given for the operation of the micro-processor unit. The description reflects primarily the operation of a needle type printer but, as stated, ink jet printing or thermo transfer printing is also invisioned here. In order to run the particular circuit, one needs information to be loaded into the needle time register 1, the mode register 3, the shift time register 5, and the delay time register 6. The loading occurs in commensurate with the control and access signals A0, A1, CS, and E whereby the address signals determine which of the registers will receive the content of data bus B1 as supplied by D1 through D8. CS accesses this unit 45 as a whole. These signals, as stated, being access and timing signals, are primarily received by the clock generator with address decoder 2, which controls access to these various registers. In that sense then, this unit 2 in conjunction with mode register 3 provides an internal master control for the micro-processor extension 45. Depending upon the combination of signals as they are received, one or the other of the registers 1, 3, 5, and 6 is accessed to indicate destination of the information that is now provided to the data bus B1 via data input lines D1 through D8. After loading the initial information into the registers 1, 3, 5, and 6, the internal processing takes over, data proper can be transferred and will be transferred into the register 4 which is basically an asynchronus transfer determined by the external device. Through internal processing either dependent upon CK or by means of a clock formed from the signals A0, A1, CS, and E, the received print information and clock bits are transferred to register 7. In the meantime, the mode register 3 has set up the switching matrices 10 and 11 for straight left or right printing. This set up remains, of course, the same for at least one character. The content of this register 7 is now, through internal timing, transferred via the select logic and switching matrix 10 to the variable delay registers 12. As soon as this transfer into registers 12 has been completed a new character can be loaded into the register 4 serving, so to speak, as a buffer. During this transfer, the previously received data are shifted through the register 12 in a manner described above, and at a rate determined by the content of register 8. Whatever bit emerges from any of the registers 12 will be distributed in select circuit and switching matrix 11 to the respective needle controllers, 13 through 24, which operate from then on autonomously for the control of the respective print elements as connected to terminals N1 through N12, the timing having been set by the internal operation of the shift register 12.

The invention is not limited to the embodiments described above, but all changes and modifications thereof, not constituting departures from the spirit and scope of the invention, are intended to be included.

We claim:

1. Digital micro-processor for generating obliquely oriented character printing (cursive writing) under utilization of matrix print principles, the printer including a plurality of print elements arranged in one or more columns, as well as a character generator and circuit means for controlling the print elements depending upon information stored in the character generator, the micro-processor including and comprising the following combination of elements;

a plurality of shift registers for operating in parallel, including a register for a longest delay and a register for a shortest delay, and registers for delays inbetween, in an ordered sequence;

data register means for receiving print characters and representations thereof;

first circuit means for selecting column organized print information from the data register means to be shifted through said shift registers in a first orientation such that a high point in a column receives the longest, and a low point, the shortest delay, and for inverting said order in response to a reversal in direction of printing;

a plurality of print element control circuits;

data bit distributing circuit for selectively feeding the data bit having been shifted through the shift registers in the initial or the inverted order to the control circuits;

circuit means bypassing the shift registers for directly feeding the data from the data register to the print element control circuits; a general delay register connected for receiving and holding a delay representing number;

and a countdown device connected to said general delay register for down counting the number of said delay register to thereby introduce a particular overall delay of printing, the number differs for different directions such that vertical alignment of printed characters obtains.

2. Mirco-processor as in claim 1, including means for varying the shift rate through said shift registers to thereby vary the angle of obliqueness of printing.

* * * * *